Aug. 12, 1947.  K. WILSON  2,425,449
TRACTOR HITCH
Filed April 11, 1945
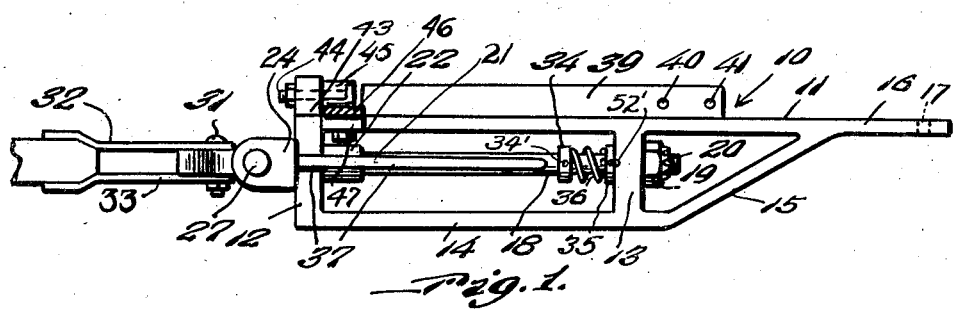
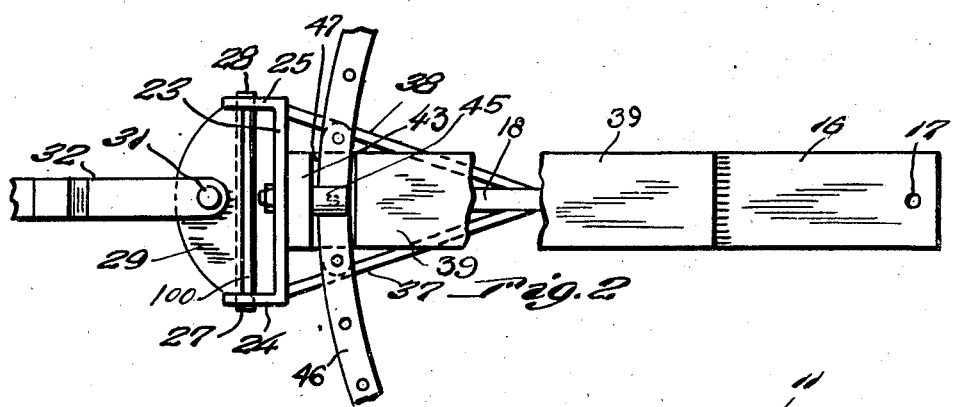
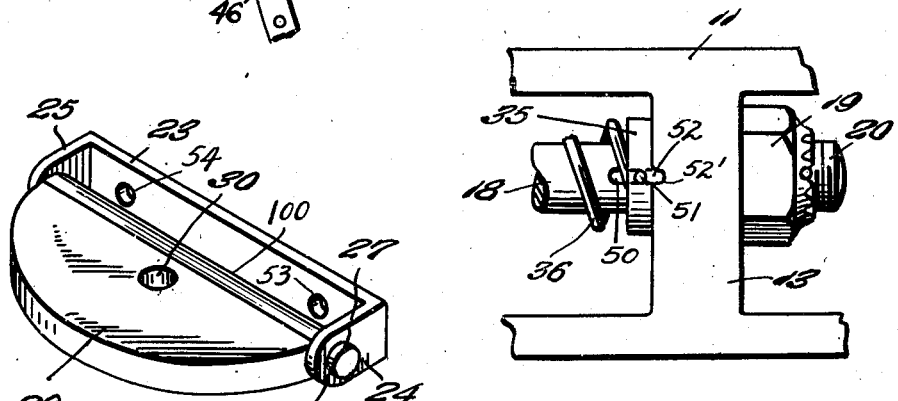
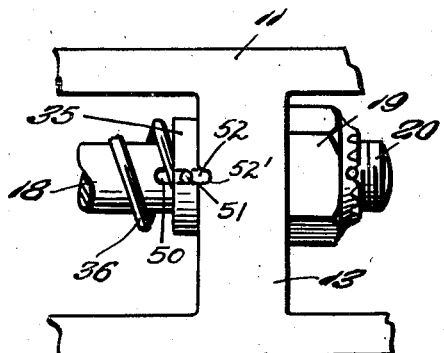
Inventor
Kelly Wilson
By Clarence A. O'Brien
and Harvey B. Jackson
Attorneys Patented Aug. 12, 1947

2,425,449

UNITED STATES PATENT OFFICE 2,425,449

TRACTOR HITCH

Kelly Wilson, Lookout, Okla.

Application April 11, 1945, Serial No. 587,753

3 Claims. (Cl. 280—33.44)

This invention relates to improvements in tractor hitches and has for its object to provide a universal hitch between a tractor and an implement being drawn thereby.

Another object of the invention is to provide a hitch of such substantial formation that there will be little or no danger of breakage thereof.

A further object of the invention is to provide a hitch which is so compact that very slight vibration will result in the connection between a tractor and drawn implement as the rigidity of my hitch practically makes the two a single unit.

Other features and advantages will become more readily apparent from the following description and the accompanying illustrative drawings in which:

Figure 1 is a side elevational view of my improved hitch,

Figure 2 is a top plan view thereof,

Figure 3 is a detail perspective view of a hitch connection, and

Figure 4 is a detail of a tension device.

Like reference characters indicate like parts throughout the following specification and in the several views in the drawings in which 10 indicates the hitch which includes a draw bar 11 formed with spaced depending plates 12 and 13 whose lower ends are connected together by the bar 14 extending parallel to said draw bar 11 and being of lesser length, together with an upwardly extending brace 15 connected between the forward end of the bar 14 and the end 16 of the draw bar 11, which is apertured at 17 to receive a suitable king bolt (not shown) for connection to a tractor. All of the parts 11, 12, 13, 14 and 15 are connected together to form an integral construction.

The plate 13 is formed with a horizontal bore (not shown) through which the front end of a hitch rod 18 is rotatably mounted, while a nut 19 is adapted to thread onto the threaded front end 20 thereof. The rear end 21 of said hitch rod 18 extends through a bearing collar 22 secured to the forward surface of the plate 12 and through an aligned bore (not shown) formed through said plate 12.

A U-shape bearing member 23 is formed with the rearwardly extending ears 24 and 25, which are apertured at 26 to rotatably support the pivot ends 27 and 28 of a pivot pin 100 to which the arcuate or semi-circular hitch plate 29 is welded or otherwise attached. A vertical centrally located aperture or bore 30 is formed through the plate 29 for receiving the bolt 31 for connecting the hitch straps 32 and 33 of a drawn implement (not shown) to said hitch.

A collar 34 is fixed about the hitch rod 18 by means of a pin or key 34', and a loose collar 35 is mounted about the hitch rod 18 in spaced relation to said collar 34, being separated by a coil spring 36 disposed about said hitch rod 18. A longitudinally extending slot 50 is formed through the hitch rod 18 and slidably receives the cross pin or key 51 extending through the collar. Slots 52 are formed in the rear edges of the plate 13 for receiving the projections 52' formed on the opposite sides of the washer 35 for normally holding the draw bar 11 in its proper position.

Brace rods 37 and 38 are secured in the openings or bores 53 and 54 at their rear ends, and are connected at their forward ends to the hitch bar 18 in any desired manner.

A draw bar supporting bar or member 39 is provided for attachment to a tractor (not shown) by means of bolts (also not shown) which will extend through the transverse bores 40 and 41 formed through said bar or member which is swingable with respect to the draw bar 11.

The plate 12 is extended upwardly to form the extension 43 which extends above the draw bar 11, being formed with a horizontal bore (not shown) for receiving the bolt 44 upon which a roller 45 is mounted, the same having a rotatable bearing upon the arcuate track 46 bolted to the rear end of the draw 11 by means of the bolts 47.

The above described device is designed to provide universal connection between a tractor and an implement drawn thereby. The bore 17 permits horizontal movement of the device relative to a tractor, the rod 18 permits vertical rotation of member 25 and with its plate 29 the pintles 27 and 28 permit up and down swinging motion of plate 29 and the pin 31 permits members 33 and 32 substantially right-angular horizontal movement relative to the rest of the device, thus providing extremely flexible movement between a drawing and a drawn machine. The spring 36 acts to hold the members 25 and 29 normally in horizontal position.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention, that which I claim as new and desire to procure by Letters Patent is:

1. A hitch comprising a pair of parallel, horizontally disposed members, vertical connecting plates therefor, an inclined connection between said members, all integrally formed, a bearing member having a pivot bearing in an opening in one of the plates, a rod connected to the pivot, a collar fixed on the rod, a collar loose on the rod and fixed to one of said plates, a coil spring on the rod between said collars and fixedly connected to each thereof, said rod projecting through an opening in the other plate, and having a nut screwed thereon, a hitch plate pivotally mounted on said bearing member, and braces connecting said bearing member and said rod.

2. A hitch comprising a pair of parallel, horizontally disposed members, vertical connecting plates therefor, an inclined connection between said members, all integrally formed, a bearing member having a pivot bearing in an opening in one of the plates, a rod connected to the pivot, a collar fixed on the rod, a collar loose on the rod and fixed to one of said plates, a coil spring on the rod between said collars and fixedly connected to each thereof, said rod projecting through an opening in the other plate, and having a nut screwed thereon, and a hitch plate pivotally mounted on said bearing.

3. A hitch comprising a pair of parallel, horizontally disposed members, vertical connecting plates therefor, an inclined connection between said members, all integrally formed, a bearing member having a pivot bearing in an opening in one of the plates, a rod connected to the pivot, a collar fixed on the rod, a collar loose on the rod and fixed to one of said plates, a coil spring on the rod between said collars and fixedly connected to each thereof, and said rod projecting through an opening in the other plate and having a nut screwed thereon.

KELLY WILSON.

REFERENCES CITED

The following references are of record in the file of this patent:

UNITED STATES PATENTS

| Number | Name | Date |
| --- | --- | --- |
| 1,610,083 | Franzen | Dec. 7, 1926 |
| 1,991,684 | Ketel | Feb. 19, 1935 |